United States Patent [19]
Plamthottam et al.

[11] Patent Number: 5,180,635
[45] Date of Patent: Jan. 19, 1993

[54] HIGH PERFORMANCE PRESSURE SENSITIVE ADHESIVE TAPES

[75] Inventors: Sebastian S. Plamthottam, Upland; Yehuda Ozari, Arcadia, both of

[73] Assignee: Avery Dennison Corporation, Pasadena, Calif.

[21] Appl. No.: 604,363

[22] Filed: Oct. 26, 1990

Related U.S. Application Data

[63] Continuation of Ser. No. 333,135, Apr. 4, 1989, abandoned, which is a continuation-in-part of Ser. No. 209,896, Jun. 22, 1988, abandoned, which is a continuation-in-part of Ser. No. 69,376, Jul. 1, 1987, abandoned.

[51] Int. Cl.$^5$ ............................................. B32B 7/12
[52] U.S. Cl. ................................... 428/345; 428/343; 428/354; 428/355; 428/347; 427/208
[58] Field of Search ............... 428/343, 345, 354, 346, 428/347, 355; 427/208

[56] References Cited

U.S. PATENT DOCUMENTS

| | | | |
|---|---|---|---|
| 4,223,067 | 9/1980 | Levens | 428/313.9 |
| 4,404,246 | 9/1983 | Charbonneau et al. | 428/355 X |
| 4,522,870 | 6/1985 | Esmay | 428/345 X |
| 4,612,242 | 9/1986 | Vesley et al. | 428/317.5 X |
| 4,666,771 | 5/1987 | Vesley et al. | 428/406 X |
| 4,748,061 | 5/1988 | Vesley | 428/355 X |
| 4,818,610 | 4/1989 | Zimmerman et al. | 428/345 |
| 4,820,746 | 4/1989 | Rice et al. | 522/127 |
| 4,855,170 | 8/1989 | Darvell et al. | 428/354 X |
| 4,950,537 | 8/1990 | Vesley et al. | 428/345 |
| 5,100,728 | 3/1992 | Plamthottam et al. | 428/345 |

*Primary Examiner*—George F. Lesmes
*Assistant Examiner*—D. R. Zirker
*Attorney, Agent, or Firm*—Christie, Parker & Hale

[57] ABSTRACT

A pressure sensitive adhesive tape comprises a carrier layer having a thickness of 0.1 to 4.0 millimeter and comprising a rubber based pressure sensitive adhesive matrix including a polythiol crosslinking agent and 10 to 30% by volume low density microspheres. Preferably, at least one pigment is present in an amount sufficient to color the tape. Fumed silica is preferably present in an amount up to 5% by weight. The tape preferably has a skin layer on each side of the carrier layer. The skin layer has a coating thickness of 25 to 125 g/m$^2$ and comprises a pressure sensitive adhesive matrix preferably the same as the carrier layer which is free of rigid, low density microspheres.

4 Claims, No Drawings

HIGH PERFORMANCE PRESSURE SENSITIVE ADHESIVE TAPES

This is a continuation of application Ser. No. 07/333,135, filed Apr. 4, 1989, which is a C-I-P of Ser. No. 07/209,896, filed Jun. 22, 1988, which is a C-I-P of Ser. No. 07/069,376, filed Jul. 1, 1987, all now abandoned.

FIELD OF THE INVENTION

This invention relates to pressure sensitive adhesive tapes and more particularly to electron beam-cured double-coated rubber based pressure sensitive adhesive tapes.

BACKGROUND OF THE INVENTION

A variety of double-coated tapes are being used for structural bonding in certain applications replacing spot welds, tack welds, or rivets. Such applications include, for example, the bonding of side molding to automobiles, fiberglass body panels to motor homes, plexiglass inspection windows onto equipment cabinets, and the like. The foam layer of these tapes usually has a polymer matrix based on polyethylene, polyurethane, polyvinyl chloride, or polychloroprene. These tapes exhibit poor conformability around curved substrates.

U.S. Pat. No. 4,223,067 to Levens, assigned to Minnesota Mining and Manufacturing Co., describes a method for making conformable acrylic pressure sensitive adhesive tapes using on web-polymerization technology. In the process, a mixture of monomers and 20 to 65 volume percent glass microbubbles is coated onto a backing sheet and then polymerized to a pressure sensitive adhesive state. The polymerization may be initiated by ultraviolet light or less preferably by heat if the mixture includes a heat-activatible polymerization initiator.

The tapes disclosed by Levens are fairly elastic under briefly applied stresses but exhibit low elasticity under prolonged stress and therefore adhere to rough and uneven surfaces. These tapes exhibit high peel adhesion. The method of Levens, however, requires a long duration to complete polymerization. This makes the tapes expensive to produce. Moreover, coatings having a thickness greater than about 0.2 mm involving neat monomers tend to produce excessive bubbles. If ultraviolet light is used to accomplish polymerization, the composition must be UV transparent. This means that the composition must be free of coloring pigments, or other ultraviolet light absorbing fillers. Also, because the process requires the compositions to comprise a photoinitiator, the compositions tend to yellow over time.

U.S. Pat. No. 4,612,242 to Vesley et al., also assigned to Minnesota Mining and Manufacturing Co., indicated that the white color of the Levens tape, caused by the absence of pigment, made the tape undesirably visible in certain applications, but that the addition of carbon black in an amount sufficient to produce a desirable black appearance would block the ultraviolet radiation from polymerizing the mixture to a pressure-sensitive adhesive state. Vesley et al.'s solution to the problem was to coat the glass microbubbles with an inorganic film, e.g. silver, having a thickness that does not unduly inhibit polymerization.

While the method of Vesley et al. does impart some color to the tapes, it has certain drawbacks. It still takes a long time to effect polymerization, making the tapes expensive to produce. Moreover, glass microbubbles having an inorganic coating are expensive, adding to the cost of producing the tapes. Only a limited number of colors are available in this process.

SUMMARY OF THE INVENTION

The present invention provides a pressure sensitive adhesive (PSA) tape comprising at least one carrier layer having a composition comprising a cross-linked polymer matrix, preferably a cross-linked PSA polymer matrix, and more preferably, an electron beam-cured PSA polymer matrix. The carrier layer further comprises low density microspheres and, preferably, at least one pigment. The carrier layer is preferably coated on each side with a skin layer having an adhesive polymer matrix free of rigid low density microspheres.

The polymer matrix of the carrier layer is a rubber based PSA polymer matrix. The polymer matrix constitutes from 30% to about 90% by volume, preferably from about 55% to about 90% by volume and more preferably from about 70% to about 85% by volume of the carrier layer, the balance being made up of fillers.

The low density microspheres of the carrier layer are generally in the size range of from about 10 microns to about 300 microns and may be made of ceramic, polymeric, glass, carbon or other suitable material. Mixtures of such low density microspheres may be used. The low density microspheres may be solid, hollow or porous, rigid or elastomeric, and tacky or nontacky. The material of the low density microspheres, if desired, may be selected to cross-link with the polymer matrix during curing.

The low density microspheres are present in an amount of from about 5% to about 70% by volume of the carrier layer and preferably in an amount of from about 5% to about 45% by volume and more preferably in an amount of from about 10% to about 30% by volume of the carrier layer.

A pigment may be present in an amount sufficient to impart color to the tape. Pigment may be a solid inorganic filler such as carbon black, titanium dioxide or the like, or may be organic dyes.

Preferably, the carrier layer comprises fumed silica in an amount of up to about 5% by weight and more preferably in an amount of from about 1% to about 2% by weight.

The thickness of the carrier layer is not critical but is preferably in the range of from about 0.1 mm to about 4.0 mm and more preferably in the range of from about 0.25 mm to about 2.0 mm. The coating thickness of the rigid low density microsphere-free skin layers is preferably about 25 to about 125 grams/square meter.

The tapes of the present invention exhibit outstanding peel adhesion and excellent shear adhesion failure temperature, a combination undisclosed in the prior art.

DETAILED DESCRIPTION OF THE INVENTION

In a particularly preferred embodiment of the present invention, there is provided a double-coated PSA tape having outstanding peel adhesion and shear adhesion failure temperature. The double-coated PSA tape is a composite structure comprising a middle carrier layer and a skin layer on each side of the carrier layer.

The thickness of the carrier layer is not critical but is preferably from about 0.1 mm to about 4.0 mm and more preferably from about 0.25 mm to about 2.0 mm. Likewise the coating thickness of the skin layer is not critical but is preferably in the range of from about 25 g/m² (approximately 1 mil) to about 125 g/m² (approximately 5 mils).

Carrier layers having a thickness greater than about 4.0 mm are not preferred because they contain excess material which is generally not needed for most applications. Further, thicker carrier layers tend to be more visible in a particular application and are therefore not generally preferred because they are less aesthetically pleasing. Such carrier layers also require higher voltages for electron-beam curing. Carrier layers having a thickness less than about 0.1 mm are not preferred for applications involving irregular surfaces because they tend to exhibit insufficient conformability. Thicknesses in the range of about 0.25 mm to about 2.00 mm are suitable for most applications.

The skin layers typically exhibit better adhesion than the carrier layer and thus enhance the overall adhesion of the tape. Skin layers having a coating thickness less than about 25 g/m² are not preferred because no significant benefit is seen. Skin layers having a coating thickness greater than about 125 g/m² are not preferred because no additional benefit is seen with greater thickness.

In accordance with the invention, the carrier layer comprises a cross-linked polymer matrix and low density microspheres. The polymer matrix comprises at least one rubber-based polymer and at least one polythiol cross-linking agent as described in U.S. Pat. No. 4,820,746, which is incorporated herein by reference. Cross-linking is preferably accomplished by electron-beam curing.

Rubber-based PSA polymer matrices useful in the practice of the present invention may be formulated as solvent, hot melt, or emulsion, with hot melt or solvent based adhesives presently being preferred. The PSA matrices employed are normally based on di-block, tri-block, or radial block copolymers and mixtures thereof. Other resin-modified elastomers could be used. The rubber-based polymer, to be functional, should have a net effective glass transition temperature of from about 15° C. to about 70° C. below the use temperature, preferably from about 35.C to about 70.C below the use temperature. Rubber based polymers suitable for use in the present invention are described in U.S. Pat. Nos. 3,239,478 to Harlan, 4,152,231 to St. Clair, et al., 3,676,202 to Korpman, 3,783,072 to Korpman, 3,932,328 to Korpman and 4,028,292 to Korpman, all of which are incorporated herein by reference.

It is presently preferred that the rubber-based pressure-sensitive adhesive compositions enhanced in accordance with the instant invention be styrene-butadiene-styrene, styrene-isoprene-styrene, styrene-butadiene and styrene-isoprene block copolymers, such as the Kraton thermoplastic elastomers manufactured and sold by Shell Chemical Company or radiation curable styrene-ethylene-butylene block copolymers.

The polythiols used to enhance the high-temperature properties of the rubber-based pressure-sensitive adhesive may vary widely. We have found that polythiols in which the thiol group is connected to the balance of the polymer chain through an ester linkage are particularly effective.

While no use limiting the functional polythiols which may be used therein mentioned includes pentaerythritol-tetrathioglycolate (PETTG), dipentaerythritol-tetra (3-mercaptopropionate), pentaerythritoltetra (3-mercaptopropionate) (PETMP), trimethylolethane- trimercaptopropionate (TMETMP), trimethylolpropanetrithioglycolate (TMPTG), glycoldimercaptoacetate; 2,2,dimercaptodiethylether, polyethyleneglycoldimer-captoacetate, polyethyleneglycol (e-mercaptopropionate, trimethyloltri (3-mercaptopropionate), trimethylolpropanetri (3-mercaptopropionate) (TMFTMP) and the like. Trimethylolpropane- tri(3-mercaptopropionate) is present preferred. Polythiol concentrate can range from up to about 10% by weight or more of the rubber preferably from about 0.3 to about 0.6% by weight based on the total weight of the rubber and more preferably from about 0.1 to about 1% by weight. Remarkable results can be obtained in a concentration of less than 1% polythiol.

Cross-linking of the polymer matrix is preferably accomplished by electron-beam curing. While not presently preferred, other suitable methods for curing the polymer matrix may be used. For example, if the polymer matrix comprises a heat-activatible cross-linking agent, curing by the application of heat may be used. If the polymer matrix also contains a microwave absorbing agent, microwave radiation may be used to effect curing. If the polymer matrix comprises a pigment, ultra-violet radiation is not an appropriate method for curing the polymer matrix of the present invention.

The polymer matrix is present in the carrier layer in an amount of from about 30% and preferably from about 5% to about 90% by volume, and more preferably in an amount of from about 70% to about 85% by volume. Stated in another way, the total amount of fillers should be at least 10% by volume and no more than about 70%, and preferably no more than about 45% by volume, and more preferably in the range of from about 15% to about 30% by volume. Carrier layers having more than about 45 volume percent fillers, or more than about 70 volume percent fillers, if very low density fillers, e.g., phenolic hollow microspheres, are used, tend to exhibit low elongation and high modulus and not generally suitable for PSA applications. Likewise, carrier layers having less than about 10% by volume fillers are not preferred because the resultant tapes generally possess too low of a modulus.

Carrier layers having from about 15 to about 30 volume percent fillers are most preferred because such compositions tend to exhibit the best combination of properties such as high peel adhesion and high shear adhesion failure temperature.

The carrier layer also comprises from about 5% to about 70% by volume, preferably 5% to about 45% by volume, and more preferably from about 10% to about 30% by volume low density microspheres. The low density microspheres tend to reduce the density of the carrier layers, generally improve peel adhesion and thereby improve conformability and also improves the strength properties, i.e. the combination of elongation and tensile strength of the layer.

The low density microspheres may be solid, hollow or porous and rigid or elastomeric. The low density microspheres may be made of any suitable material including glass, ceramic, polymeric and carbon materials.

Polymeric low density microspheres may be made of rigid materials or elastomeric materials. Suitable polymeric materials include thermosetting polymers, e.g., phenolic polymers, or thermoplastic polymers, e.g. polyvinylidene chloride acrylonitrile copolymers (PVDC copolymers). It is expected that thermoplastic polymer microspheres will cross-link and graft to the polymer matrix when electron-beam radiation is used to cure the polymer matrix. By cross-linking the low density microspheres and grafting to the polymer matrix, properties such as tensile strength could be improved.

As used herein, "low density microspheres" include rigid microspheres having a density of less than about 1.0 g/cc and elastomeric microspheres having a density of less than about 1.5 g/cc. Accordingly, rigid microspheres made of glass, ceramic or other material and having a density greater than about 1.5 g/cc are not preferred. Such high density microspheres tend to adversely increase the density of the carrier layer requiring higher electron-beam voltages for curing.

Hollow microspheres, which are generally available in a wide variety of densities and crush strengths, are presently preferred. Ceramic hollow microspheres are particularly preferred because they exhibit high crush strength and tend to be less expensive than glass, polymeric or hollow carbon microspheres.

The size, i.e., the average diameter, of the low density microspheres is preferably from about 10 to about 300 microns. Low density hollow microspheres having a diameter less than about 10 microns may be suitable but are not presently commercially unavailable for evaluation.

Low density hollow microspheres having an average diameter greater than about 300 microns are not preferred at the present time due to a lack of commercial availability and because they are expected to exhibit an undesirable low crush strength.

If the carrier layer comprises rigid, low density microspheres made of, for example, glass or ceramic having a density of from about 0.2 to about 1.0 g/cc, it is preferred that the loading of a low density microspheres not exceed about 45% because carrier layers with higher loading tend to exhibit very low elongation. If low density rigid microspheres having a density less than about 0.2 g/cc, e.g., hollow phenolic microspheres, are used, the loading may be as high as about 70% by volume. If low density elastomeric microspheres are used, loadings as high as about 70% by volume may be used.

Carrier layers having less than about 5 volume percent low density microspheres of any kind are not preferred because the benefit of the low density microspheres is insufficiently realized, e.g., the peel and shear adhesion tends to be too low. Moreover, the density of the carrier layer increases as the volume loading of the low density microspheres decreases, and thus, low loadings requires a higher electron beam voltage for curing. Consequently, such carrier layers tend to be more expensive to produce. Volume loadings between about 10% to about 30% are most preferred because carrier layers having such loadings tend to exhibit the optimum combination of elongation and tensile strength and other physical properties. Particularly preferred carrier layers have from about 15.0% to 30.0% by volume low density microspheres.

One or more pigments may be present in the composition to give color to the tape. Solid particulate pigments tend to improve strength characteristics, i.e. increase the tensile strength and reduce the elongation of the tape. As used herein, the term "pigment" refers to any coloring agent compatible with or dispersible in the polymer matrix. The pigments may be solid particles such as carbon black and other particulate pigments or titanium dioxide or organic dyes such as phthalocyanine green sold by American Hoechst or 2915 dianisidine orange sold by Harshaw Chemical. The particular type of pigment used will depend upon the color desired. For example, carbon black may be used if the desired color is black. Titanium dioxide may be used if the desired color is white.

The particle size range and the loading of the pigment depends on the type of pigment utilized. For carbon black, a loading of up to about 5% by weight may be used. Loadings as low as about 0.25% by weight are found to be sufficient to impart a suitable black color to the tape. With respect to carbon black, any suitable commercially available carbon black may be utilized. A particularly preferred carbon black is Monarch 700 carbon black, manufactured by Cabot Corporation.

In addition to the low density microspheres and pigment, it is preferred that the carrier layer comprise a filler such as fumed silica. Hydrophobic or hydrophilic silica could be used. Fumed silica lowers the elongation and increases the tensile strength of the carrier layer. Accordingly, the preferred amount of fumed silica is selected to provide the best balance of elongation and tensile strength. The fumed silica could be replaced by carbon black, if desired.

The fumed silica is preferably present in an amount of up to about 10% by weight of the carrier layer. Loadings greater than about 10% tend to result in a carrier layer which is too stiff and insufficiently conformable for most applications. Loadings of from about 3% to about 5% by weight have been found to impart the best combination of tensile strength and elongation and are hence presently preferred.

Small, rigid high density solid microspheres having a density greater than 1.0 g/cc and a size or average diameter of less than about 10 microns and preferably from about 0.1 to about 5 microns may be used as an alternative to or in combination with fumed silica to lower the elongation and increase the tensile strength of the carrier layer. The small, rigid, high density solid microspheres may be present in an amount of up to about 5% by weight. Above about 5% by weight the carrier layer tends to become too stiff. It is presently preferred that the small, rigid, high density solid microspheres be present in an amount of from about to about 2% by weight.

It is understood that the preferred loadings of the various above-mentioned fillers are dependent upon the precise characteristics which are sought and on the amounts of the other fillers present in the carrier layer. For example, a relatively high loading of solid fillers, e.g., fumed silica or small, rigid, high density microspheres may be preferred if the loading of low density microspheres is low. Lower loadings may be preferred if the amount of microspheres is high.

It is further understood that many other fillers, e.g., calcium carbonate, china clay, mica, etc., may be incorporated into the carrier layers as desired.

The skin layers are preferably unfilled layers of an adhesive polymer matrix or, less preferably, may be an adhesive polymer matrix filled with pigment. The skin layer preferably contains no low density microspheres. The polymer matrix of the skin layer may be any polymer matrix which exhibits good adhesion with the carrier layer. However, it is preferred that the polymer matrix of the skin layer be the same as the polymer matrix of the carrier layer.

The pressure sensitive adhesives of the present invention may be coated onto a backing film by an suitable method. For example, a mixture of the polymer matrix, fillers and solvent may be coated onto a backing film to a desired thickness. The solvent is then removed by drying before curing. Alternatively, a mixture comprising the polymer matrix and fillers and without solvent may be extruded as such a sheet or the like onto a backing sheet. A calendaring process may also be used.

A particularly preferred process for coating the adhesives of the present invention is described in U.S. patent application Ser. No. 209,896, filed Jun. 22, 1988, now abandoned, which is incorporated herein by reference. In that process, the carrier layer is made by first preparing an adhesive composition containing the polymer matrix, solvent for the polymer matrix and the desired fillers. The composition is introduced into an extruder and conveyed through the extruder by the rotating screws. While in the extruder, the solvent is removed by vacuum evaporation in one or more solvent removal units. An essentially solvent-free composition, i.e., a composition having less than about 2% by volume solvent, is then extruded from the extruder onto a backing film. Unfilled skin layers, if any, may be coextruded with the carrier layer onto the backing film.

Another preferred process of making the carrier layer is to blend the fillers into the hot melt adhesive and pump it through a slot die to produce a sheet. Two unfilled layers could then be laminated on either side to produce the double coated tape construction. This is especially preferred if low crush strength balloons are used.

The tape sheets or tapes thus produced are preferably cured, i.e., cross-linked, by electron beam radiation. The carrier layer may be cured prior to or after lamination of the skin layers. Typical electron beam radiation levels range from about 10 to about 100 kiloGray (kGy) and are preferably from about 30 to about 60 kGy.

The tapes of the present invention exhibit an excellent combination of rheological, adhesion and performance properties.

The peel adhesion is preferably from about 2000 to about 12000 Newtons/meter and more preferably from about 4000 to about 12000 Newtons/meter as measured similar to PSTC No. 3. In the test, one side of the tape is laminated to soft 0.05 mm aluminum foil and then tested after laminating the other side to the substrate with a 6.8 kg roller, two passes, and then waiting for twenty minutes. If the peel adhesion is greater than 3500 Newtons/meter, a 5 mil polyester film is used rather than aluminum foil.

Shear Adhesion Failure Temperature (SAFT) is preferably at least about 90.C and more preferably at least about 110° C. SAFT is determined by first bonding aluminum foil to one side of the tape and then cutting out a one inch by two inch section. Half, i.e., a one inch square of the side of the tape opposite the aluminum foil, is then bonded to a near vertical (approximately 3° tilt from vertical) stainless steel substrate so that the other half overhangs the bottom of the substrate. A one kilogram load is then attached to the overhanging free end of the tape and the temperature is raised one-half degree Centigrade per minute until failure. The temperature at which failure occurs is reported.

In the following examples, certain designations and trade names are used. RB1 designates a rubber based solution adhesive comprising about 19.3% by weight Kraton 1101, a styrene-butadiene-styrene linear copolymer manufactured by Shell Chemical Co., about 16.1% by weight Finaprene 1205, a styrene-butadiene copolymer manufactured by Fina Petroleum, about 25.8% by weight Piccolyte A-115, an alpha pinene tackifier manufactured by Hercules USA, about 32.3% by weight Foral 85, a rosin ester tackifier manufactured by Hercules USA, and about 6.4% by weight Hercolyn D of an aromatic liquid tackifier manufactured by Hercules USA, and about 1.6% by weight antioxidants. RB2 is a rubber-based hot melt adhesive having the same composition as RB1 except that Kraton 1102 is used in place of Kraton 1101. Kraton 1102 is a styrene-butadiene-styrene block copolymer manufactured by Shell Chemical Co.

A-16-500 designates hollow glass microspheres marketed by Minnesota Mining and Manufacturing Co. having a true particle density of about 0.2 g/cc and a size of 20-130 microns. Q-cel 500 designates hollow glass microspheres marketed by P.Q. Corp. having a true particle density of about 0.2 g/cc and a size of 10 to 115 microns. Cab-O-Sil M5 designates fumed silica from Cabot Corp. Monarch 700 carbon black is sold by Cabot Corp. BJO 0930 is a trade designation of Union Carbide Corp. for hollow phenolic microspheres having an average particle size of 40 microns. SF-14 is a trade designation of PA Industries for hollow ceramic microspheres having a density of 0.7 g/cc and a particle size of 10-100 microns. PM6274 is a trade designation for glass mioroballoons manufactured by P.Q. Corporation, U.S.A.

EXAMPLE I

A rubber based carrier layer was prepared by mixing as a solution in toluene at 50% by weight solids 90.4% by weight (dry weight) RB1 rubber based adhesive, 0 3% by weight trimethylolpropanetrithioglycolate (TMPTG), as a cross-linking additive and 9.3% by weight (32% by volume) hollow glass A-16-500 microspheres. The solvent was stripped off by vacuum and a 0.8 mm carrier layer was prepared by compression molding. A release liner was used to prevent the carrier layer from sticking to the sides of the mold.

The rubber carrier layer thus prepared was electron beam irradiated on both sides at 300 kv, open faced under nitrogen.

An eb cured high performance rubber adhesive transfer tape was laminated on each side of the carrier layer to provide an adhesive skin layer of about 50 g/m$_2$.

Tensile test specimens were cut out from the uncoated and double-coated samples and tested for elongation and tensile strength. The results are shown in Tables I and II below.

TABLE I

| | PROPERTIES OF UNCOATED RUBBER-BASED CARRIER LAYER | | | |
|---|---|---|---|---|
| EB DOSE (kGy) | TENSILE STRENGTH (kPa) | ELONGATION (%) | 180° PEEL ON | |
| | | | SS | PE |
| 0 | 1000 | 1700 | 2400 P | 1200 P |
| 30 | 1600 | 1600 | 1700 P | 1100 P |
| 50 | 1300 | 1200 | 1900 P | — |

TABLE II

| | PROPERTIES OF DOUBLE COATED RUBBER-BASED CARRIER LAYER | | | |
|---|---|---|---|---|
| EB DOSE (kGy) | TENSILE STRENGTH (kPa) | ELONGATION (%) | 180° PEEL ON | |
| | | | SS | PE |
| 0 | 1300 | 1800 | >3900 P* | 2000 P |
| 30 | 1700 | 1900 | >3900 P* | 2300 P |

TABLE II-continued

PROPERTIES OF DOUBLE COATED RUBBER-BASED CARRIER LAYER

| EB DOSE (kGy) | TENSILE STRENGTH (kPa) | ELONGATION (%) | 180° PEEL ON SS | 180° PEEL ON PE |
|---|---|---|---|---|
| 50 | 1500 | 1700 | >3900 P* | 2200 P |

P = CLEAN PANEL FAILURE
SS = STAINLESS STEEL
PE = POLYETHYLENE
*Value at which the face stock aluminum tore.

EXAMPLE II

A rubber-based composition was prepared as in Example I comprising 90.8% by weight (dry weight) RB1 adhesive, 3.6% by weight Q-cel 500 glass hollow microsphere, 1.8% by weight BJO 0930 hollow phenolic microspheres, 3.6% by weight Cab-O-Sil and 0.2% by weight Carbon Block, Monarch 700. The solvent was stripped off by vacuum and a 0.8 mm carrier layer was prepared by compression molding. A release liner was used to prevent the carrier layer from sticking to the sides of the mold. The process was repeated and a high performance rubber adhesive transfer tape was laminated on each side of the carrier layer to provide an adhesive coat weight of about 50 g/m$_2$. Peel adhesive was measured after laminating one side of the tape to 0.127 mm Mylar.

The carrier layer by itself demonstrated a peel strength of 5300 N/m on a stainless steel substrate and 2960 N/m on a polyethylene substrate. The double coated tape exhibited a peel strength of 9400 N/m on a stainless steel substrate and 3130 N/m on a polyethylene substrate.

It is expected that the above samples could be formulated with 0.6% TMPTG for electron beam curing to improve high temperature performance without adversely affecting the above demonstrated peel strength.

EXAMPLE III

An unfilled hot melt adhesive was prepared by mixing the ingredients of the RB2 composition in a Zigma Blade mixer at about 165 C. To that composition was added 1 percent by weight TMPTMP and mixed for 10 minutes.

A double coated tape was prepared having a filled core layer containing microbubbles and unfilled skin layers on both sides of the core layer. The adhesive for the core layer was prepared by mixing 20 wt % PM6274 microballoons by incremental addition of the balloons into the above unfilled adhesive.

A series of pressure sensitive adhesive tape constructions were prepared by coating the core layer at 240, 420, and 800 g/sq.m onto unfilled skin layers on a release film to obtain a sandwich construction with the filled core at the center. These tapes were electron beam cured by irradiating both sides of the tape at 60 KGy at 290 KeV voltage.

The peel adhesion on stainless steel (ss), shear adhesion failure temperature and room temperature shear were determined as reported in Table III below.

TABLE III

| | | | | |
|---|---|---|---|---|
| Skin Layer (g/m$^2$) | 40 | 40 | 40 | 40 |
| Core Layer (g/m$^2$) | 240 | 420 | 800 | 800 |
| Skin Layer (g/m$^2$) | 40 | 40 | 40 | 40 |
| EB Dose (KGY) | 60 | 60 | 60 | 0 |
| Peel Adhesion on SS (N/m) | 1860 | 2740 | 4250* | 9350* |
| Shear Adhesion Failure Temperature (°C.) SAFT | 91 | 116 | 134 | 65 |
| Room Temperature Shear 2.54 × 2.54 cm, 1 Kg (Mins.) | >10,000 | >10,000 | >10,000 | >3,000 |

*using 7 mil Mylar face stock
SAFT ¼° C./minute 2.54 × 2.54 cm overlap 1 Kg. wt.

EXAMPLE IV

A series of tape construction was prepared as described in Example III with the RB2 composition and TMPTMP but with a middle core layer at 600 g/sq.m coat weight containing 10 20 and 30 wt % PM6274 microballoons and skin layers of unfilled adhesive at 50g/sq.m coat weight. The tapes were electron beam cured as in Example III.

The peel adhesion on stainless steel and shear adhesion failure temperature were determined as reported in Table IV below.

TABLE IV

| | | | |
|---|---|---|---|
| Microballoon in core layer (wt %) | 10 | 20 | 30 |
| Skin layer (g/m$^2$) | 50 | 50 | 50 |
| Coke layer (g/m$^2$) | 600 | 600 | 600 |
| Skin layer (g/m$^2$) | 50 | 50 | 50 |
| EB Dose (KGY) | 60 | 60 | 60 |
| Peel Adhesion on SS (N/m) | 5400 | 5080 | 6800 |
| Shear Adhesion Failure Temperature (°C.) SAFT | 105 | 120 | 135 |

EXAMPLE V

A series of tape constructions were prepared as in Example IV but containing 20, 30 and 40 vol% SF-14 ceramic microballoons in the middle core layer. The peel adhesion on stainless steel and shear adhesion failure temperature were determined as reported in Table V below.

TABLE V

| | | | |
|---|---|---|---|
| Microballoon in core layer (Vol %) | 10 | 20 | 30 |
| Skin layer (g/m$^2$) | 50 | 50 | 50 |
| Core layer (g/m$^2$) | 650 | 650 | 650 |
| Skin layer (g/m$^2$) | 50 | 50 | 50 |
| EB Dose (KGY) | 60 | 60 | 60 |
| Peel Adhesion on SS (N/m) | 5720 | 7320 | 7880 |
| Shear Adhesion failure temperature (°C.) SAFT | 90 | 140 | 129 |

What is claimed is:

1. An electron beam cured pressure sensitive adhesive tape having:
   a carrier layer prepared from a composition comprising a rubber-based black copolymer matrix and a polythiol crosslinking agent and from about 5% to about 70% by volume low density microspheres; and
   a skin layer on at least one side of the carrier layer, said skin layer comprising a rubber-based adhesive block copolymer matrix and a polythiol cross-linking agent;

wherein said pressure sensitive adhesive tape has a peel adhesion of from about 4000 to 12,000 Newtons/meter and a shear adhesion failure temperature of at least about 90° C.

2. An adhesive tape as claimed in claim 1, wherein the carrier layer has a thickness of from about 0.1 to about 4.0 mm.

3. An adhesive tape as claimed in claim 1, wherein the carrier layer comprises from about 10% to about 30% by volume low density microspheres.

4. An adhesive tape as claimed in claim 1, wherein the adhesive has a shear adhesion failure temperature of at least about 110° C.

* * * * *

UNITED STATES PATENT AND TRADEMARK OFFICE
CERTIFICATE OF CORRECTION

PATENT NO. : 5,180,635

DATED : January 19, 1993

INVENTOR(S) : Sebastian S. Plamthottam; Yehuda Ozari

It is certified that error appears in the above-indentified patent and that said Letters Patent is hereby corrected as shown below:

On the title page, Item

[75] Inventors, after "Arcadia, both of" insert -- Calif. --.

Column 3, line 43, change "35.C" to -- 35°C --.
Column 3, line 43, change "70.C" to -- 70°C --.

Column 4, line 28, change "5%" to -- 55% --.

Column 5, line 36, change "loading" to -- loadings --.

Column 6, line 43, after "about" insert -- 1% --.

Column 7, line 50, change "90.C" to -- 90°C --.

Column 8, line 26, change "mioroballoons" to -- microballoons --.
Column 8, lines 32,33, change "0 3%" to -- 0.3% --.

Column 10, line 18, change "10 20" to -- 10,20 --.

UNITED STATES PATENT AND TRADEMARK OFFICE
CERTIFICATE OF CORRECTION

PATENT NO. : 5,180,635
DATED : January 19, 1993
INVENTOR(S) : Sebastian S. Plamthottam; Yehuda Ozari It is certified that error appears in the above-indentified patent and that said Letters Patent is hereby corrected as shown below:

In the Claims

Column 10, line 61, change "black" to -- block --.

Signed and Sealed this

First Day of March, 1994

*Attest:*

BRUCE LEHMAN

*Attesting Officer*     *Commissioner of Patents and Trademarks*